United States Patent [19]

Kucar

[11] Patent Number: 5,115,454
[45] Date of Patent: May 19, 1992

[54] METHOD AND APPARATUS FOR CARRIER SYNCHRONIZATION AND DATA DETECTION

[76] Inventor: Andy D. Kucar, 249 Temby, Ottawa, Ont., Canada, K1T-2W6

[21] Appl. No.: 48,777

[22] Filed: May 12, 1987

[51] Int. Cl.$^5$ .............................................. H03D 1/24
[52] U.S. Cl. .................................... 375/77; 375/81; 329/307
[58] Field of Search ................ 375/77, 81, 83, 93; 329/304, 306, 307, 308; 455/208, 209

[56] References Cited

U.S. PATENT DOCUMENTS

| | | | |
|---|---|---|---|
| 3,669,511 | 6/1972 | Motley et al. | 375/77 |
| 3,806,815 | 4/1974 | Fletcher et al. | 375/81 |
| 3,950,616 | 4/1976 | Tammaru | 178/69.5 R |
| 4,002,834 | 1/1977 | Cocci et al. | 178/69.1 |
| 4,025,719 | 5/1977 | Nussbaumer | 375/83 |
| 4,054,838 | 10/1977 | Tretter | 375/81 |
| 4,419,759 | 12/1983 | Poklemba | 375/97 |
| 4,470,145 | 9/1984 | Williams | 375/77 |
| 4,559,499 | 12/1985 | Bursztejn et al. | 375/81 |

OTHER PUBLICATIONS

Simon, M. K., J. G. Smith; Carrier Synchronization and Detection of QASK Signal Sets, IEEE Trans. on Comm., vol. COM-22, pp. 98-106, Feb. 1974.
Simon, M. K., J. G. Smith; Offset Quadrature Communications with Decision-Feedback Carrier Synchronization, IEEE Trans. on Comm., vol. Com-22, pp. 1576-1584, Octr. 1974.
Simon, M. K.; Further Results on Optimum Receiver Structures for Digital Phase and Amplitude Modulated Sigs; ICC '78, Toronto, pp. 4211-4217, Jun. 4-7, 1978.
Gardner, F. M., W. C. Lindsey (Guest Editors), Special Issue on Synchronization, IEEE Trans. on Comm., Part 1, vol. COM-28, Aug. 1980.
Lindsey, W. C., C. M. Chie (Guest Editors); Special Issue on PLLS., IEEE Trans. on Comm., vol. COM-30, Oct. 1982.
Kucar, A. D., K. Feher; Performance of Weighted QAM in the Presence of Phase and Timing Error; Uncertainty Diagrams and ISOPER Curves, 7th International Conference on Dig. Satellite Comm., ICDSC-7, pp. 603-608, Munich, West Germany, May 12-16, 1986.
Kucar, A. D., K. Feher; Carrier Recovery Loops for Weighted QAM, IEEE Montech '86, pp. 82-85, Montreal, Sep. 29-Oct. 1, 1986.

Primary Examiner—Stephen Chin

[57] ABSTRACT

The present invention is directed to circuitry for achieving an improved carrier synchronization (i.e. estimation of carrier's phase) and data detection for digital data, suppressed carrier transmission systems. A new method—and corresponding apparatus—for pattern jitter cancellation and quadrant ambiguity removal, when incorporated within known or new carrier recovery scheme, results in an improved carrier synchronization and data detection. The resultant carrier recovery and data detection circuitry might be employed for phase estimation and the detection of balanced and unbalanced, coded or uncoded, quadrature amplitude modulation signals. Global positioning system receivers, cable, satellite and radio systems are some examples of where these circuitry might find an application.

1 Claim, 12 Drawing Sheets

METHOD AND APPARATUS FOR CARRIER SYNCHRONIZATION AND DATA DETECTION

BACKGROUND OF THE INVENTION

This invention relates to a technique for obtaining improved carrier phase synchronization and data detection in data transmission systems, and more particularly to such a technique which is especially useful in multi-state data systems (e.g. M-ary quadrature amplitude modulation cable and radio) and unbalanced data systems (e.g. Global Positioning System) where two quadrature carriers have unequal powers and unequal data rates in general.

DESCRIPTION OF THE PRIOR ART

The correct detection of WQAM signals requires accurate carrier phase and symbol timing. It is desired to estimate these parameters directly from measurements on the received data signal. Since WQAM schemes are of the suppressed carrier type, a nonlinear operation on the receiver data is necessary. When the number of states or the imbalance increases, estimation becomes more complex and a higher sensitivity to any phase uncertainty $\phi$ and timing uncertainty $\lambda$ might be expected.

Numerous systems exist in the prior art for carrier phase synchronization only, and for both phase synchronization and data detection. System described in the U.S. Pat. No. 3,669,511 patented on Jun. 13, 1972 by Motley and Salman, entitled *System for phase locking on a virtual carrier received by an asymmetrical receiver*, uses decisions on data ($b_i$, $b_q$ in their FIG. 1) to establish the proper phase (phase locking). This type of the system is usually called decision feedback carrier recovery loop, DFCRL, since decision on a signal embeded in noise made by decision devices (called A/D $40i$, $40q$ in their FIG. 1) are fed back and processed to establish an error signal necessary for the phase correction of the voltage controlled oscillator (VCO). Some authors call this type of loop data-aided carrier tracking loop, since estimated data (decisions) are used to improve the carrier tracking.

System described in the U.S. Pat. No. 3,806,815 patented on Apr. 23, 1974 by Fletcher and Simon entitled *Decision feedback loop for tracking a polyphase modulated carrier*, uses phase estimate signal (decision on phase) as decision feedback signal to improve the phase tracking.

System described in the U.S. Pat. No. 4,054,838 patented on Oct. 23, 1977 by Tretter entitled *QAM phase jitter and frequency offset correction system*, uses decision directed phase-locked loop for the phase estimation and an additional jitter correction circuit giving corrected in phase and quadrature signal components.

System described in the U.S. Pat. No. 4,559,499 patented on Dec. 17, 1985 by Bursztejn and Part entitled *Direct microwave demodulator of PSK signals with automatic gain*, uses automatic gain control within the loop to maintain the constant level of the signals X(t) and Y(t) in their FIG. 1. Threshold circuits (decision devices) 113, 114, 115, and 116 within the phase calculator in their FIG. 5 provide decisions which are used to form the feedback error signal e(t).

All four just described inventions employ decision feedback to improve estimation of phase. However, any phase error $\phi$ or timing error $\lambda$ (due to a nonideal clock —see for example Tammaru U.S. Pat. No. 3,950,616 or Cocci and Schiff U.S. Pat. No. 4,002,834 on clock desig- n—decisions do not occur at proper instants of time) causes an increased probability of error of decisions, and as a consequence, a degradation in the phase tracking.

System described in the U.S. Pat. No. 4,025,719 patented on May 24, 1977 by Nussbaumer entitled *Phase-directed decision feedback equalizer*, uses phase-directed decision feedback equalizer to compensate for the linear distortions introduced into signals by the communication channels (and not for timing error caused intersymbol interference as in our own invention), giving improved detection.

System described in the U.S. Pat. No. 4,419,759 patented on Dec. 06, 1983 by Poklemba entitled *Concurrent carrier and clock synchronization for data transmission system*, uses two phase-lock loops coupled together to improve phase and timing tracking performance. Here, derivators (202, 206 in their FIG. 1) are used to realize the nonlinearity necessary for the carrier tracking of the modulation schemes with a suppressed carrier.

System described in the U.S. Pat. No. 4,470,145 patented on Sep. 04, 1984 by Williams entitled *Single sideband quadricorrelator*, employs an additional frequency difference detector within the loop (realized with two differentiators, etc. in their FIG. 1) to improve acquisition and frequency tracking.

All mentioned inventions employ a front end (RF or IF) consisting of a signal splitter, two mixers which are driven by in-phase and quadrature component of locally generated signals provided by the VCO, and VCO itself. Different baseband processors (inventions) provide necessary nonlinearity and the error signal to the VCO input, and eventually digital data outputs (data estimates). To understand better our own invention, we will describe in details a typical state of the prior art carrier recovery loop, first.

Figure 1:
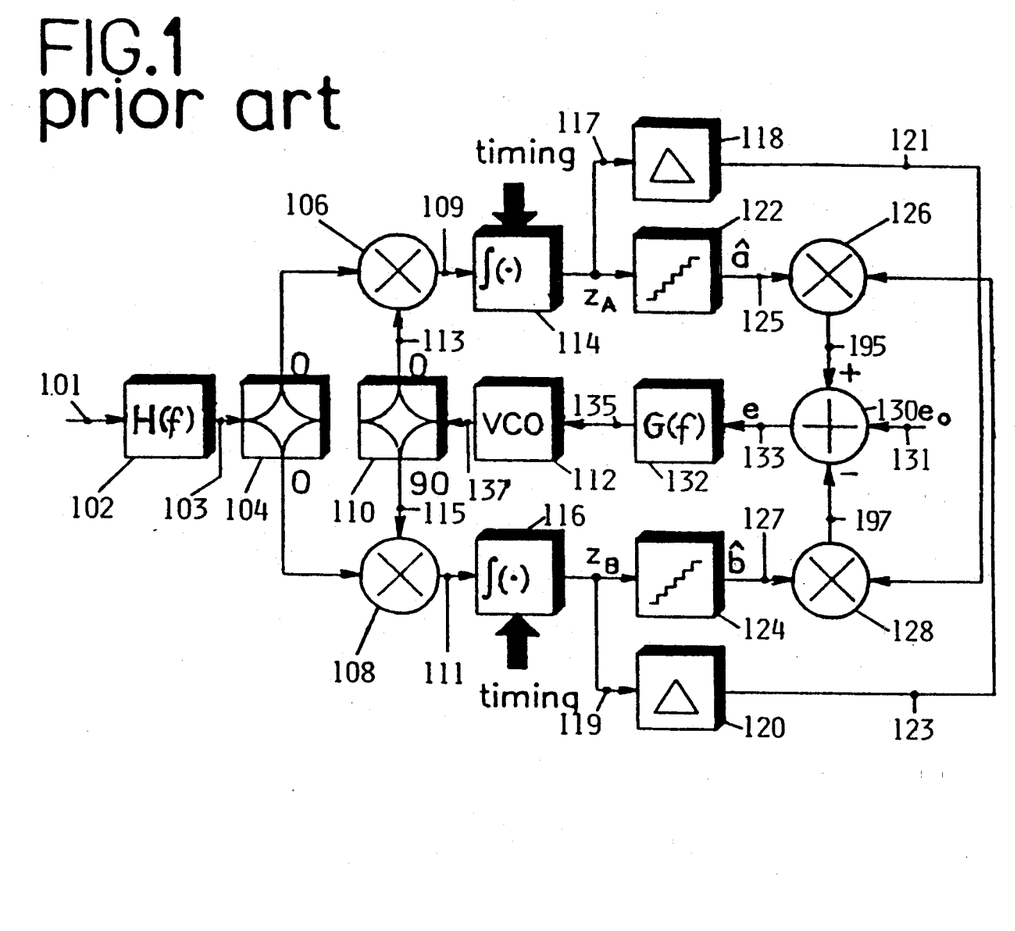
FIG. 1 is a scheme of the classical decision feedback carrier recovery loop (DFCRL).

A typical carrier recovery (carrier phase estimation and synchronization) and data detection system is given in FIG. 1. The modulated waveform is supplied to the input terminal 101 and filtered by the filter H(f) 102. Filtered signal 103 is supplied to the 0–0 degrees splitter 104 from which it is supplied as input to each of mixers 106 and 108. The input signals are then translated to the baseband (signals 109 and 111) using referent carrier signals 113 and 115 received through the 0–90 degrees splitter 110 from a voltage controlled oscillator (VCO) 112. The signals 109 and 111 are supplied to corresponding integrate-sample-and-dump (ISD) devices 114 and 116, which are receiving proper timing information from outside timing recovery circuits. Devices 114 and 116 may also be baseband low-pass filters. The output signals from these devices, i.e. $z_A$ 117 and $z_B$ 119 are supplied to delay elements 118 and 120 and to decision devices (multilevel comparators) 122 and 124. The delay elements 118, 120 provide appropriate allignments of signals 121 and 123, which are supplied to corresponding mixers 126 and 128. The other two signals 125 and 127 which are supplied to the mixers 126, 128 are digital outputs from respective decision devices 122 and 124 and represent data estimates â and b. The output signals 195 and 197 from the corresponding mixers 126, 128 are subtracted in a device 130. An additional correction signal $e_0$ (131) may be supplied to the device 130. An output from the device 130, i.e. signal e (133), is supplied to the baseband low-pass loop filter G(f) 132. An output signal 135 from the filter 132 is at the same time the input control signal to the VCO 112.

The scheme in FIG. 1 which feed back the decision signals 125 and 127 to establish a control of the loop is named decision feedback carrier recovery loop (DFCRL). Herein, we term it classical DFCRL.

The primary criterion for judging the performance of a digital system is an average probability of error $P_e$, which equals $$P_e = \int_\phi \int_\lambda P(e|x,y)p(x,y)dxdy \quad (1)$$

The functions inside integrals are conditional probability of error $P(e|\phi, \lambda)$ of decisions made by devices 122 and 124, conditioned on particular phase error $\phi$ and timing error $\lambda$ occurring within the corresponding loops, and $p(\phi, \lambda)$ is the corresponding probability density function. $\phi$ is the phase difference between phases of signals 113 and 103, and $\lambda$ is a timing error in the timing information supplied to the devices 114 and 116, 122 and 124. The presence of phase error $\phi$ and timing error $\lambda$ decreases system performance $P_e$. This degradation caused by the presence of data is known as 'pattern jitter', 'data dependent jitter', 'squaring loss', etc. This degradation is particularly critical for multilevel quadrature amplitude modulation (QAM) schemes and for unbalanced QAM schemes, uncoded or coded.

Figure 9:
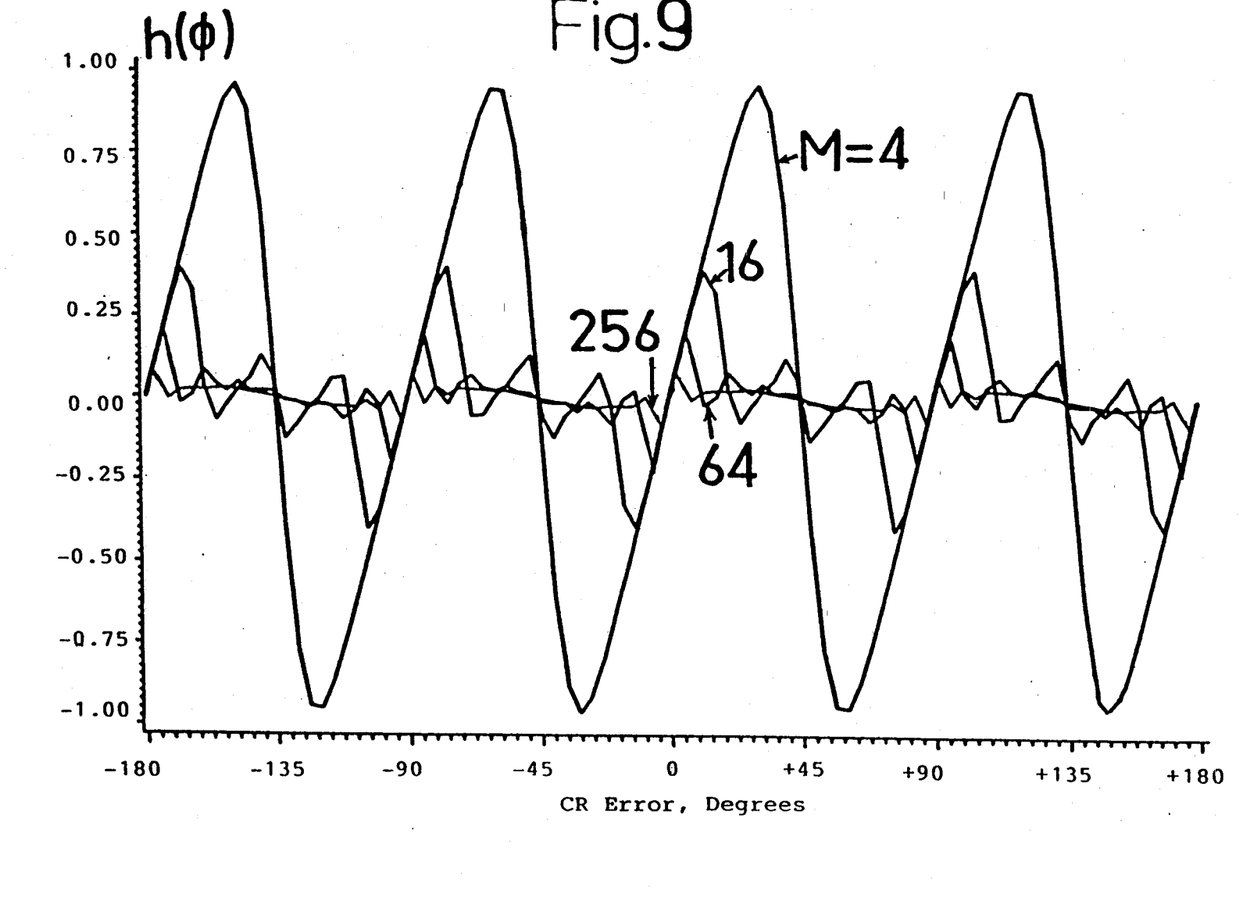
FIG. 9 is a diagram of the performance of MQAM schemes, i.e. nonlinearity S-curve of the loop (a shape of the signal 135) when classical DFCRL as given in the FIG. 1 is employed.

A further deficiency of the classical DFCRL is a quadrant ambiguity, and a differential encoding or a synchronization preamble at the transmitter is necessary to resolve this ambiguity. Even then a nonlinearity curve which describes the loop performance exhibits 90 degrees periodicity, see FIG. 9.

The model of loop caused degradations due to $\phi$ and $\lambda$ is given in FIG. 2a and will be explained further, later.

SUMMARY OF THE INVENTION

It is an object of this invention to provide a carrier synchronization (an estimation of carrier phase) and detection technique in which the system performance $P_e$ is virtually independent of carrier phase error.

It is a further object of this invention to provide a carrier synchronization which is free of pattern jitter.

It is a further object of this invention to provide a carrier synchronization in which quadrant 90 degrees periodicity is extended to 360 degrees.

These and other objects are achieved by a carrier phase synchronization and data detection technique according to the present invention. Our invention employs a new baseband signal processor (shaded part in FIG. 5 consisting of four amplifiers 554, 556, 580, 582 which gains are set according to the phase error $\phi$ provided by the device 590, two adders (550, 552), and two equalizers (540, 542) which tap gains $c_{-1}, c_0, c_{+1}$ are set according to the timing error $\lambda$.

A knowledge on carrier phase $\phi$, timing instant $\lambda$, and loop behavior accumulated over the corresponding observation intervals, i.e. past symbols (dependent on the memory of loop filter(s)—narrower filter means longer memory) is used in a constructive manner to improve a decision on the present symbol. This improved decision improves carrier synchronization (and timing synchronization, which however is not a part of this invention), this improved carrier synchronization improves decision on the next symbol, etc. The decision is now independent of carrier phase error $\phi$, and signal which governs VCO equals sin $\phi$, i.e. data are wipped-off and loop performs as a continuous wave (pilot tone) carrier recovery loop without presence of quadrant ambiguity.

BRIEF DESCRIPTION OF THE DRAWINGS

The invention will be more clearly understood with the reference to the following drawings:

FIG. 2 part a is a brief diagram of the model of degradations of the scheme given in FIG. 1 in the presence of carrier recovery error $\phi$ and timing recovery error $\lambda$.

FIG. 2 part b is a diagram of the compensating network for carrier recovery error $\phi$ and timing recovery error $\lambda$ caused degradations.

BRIEF ASSESSMENT OF THE PERFORMANCE

Figure 6:
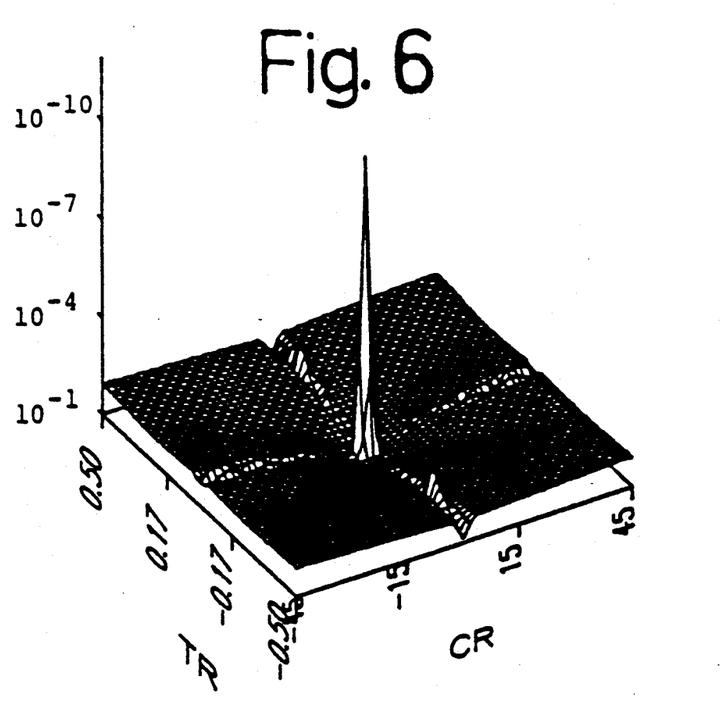
FIG. 6 is a diagram of the performance of 256 QAM scheme when classical DFCRL as given in the FIG. 1 is employed.
Figure 7:
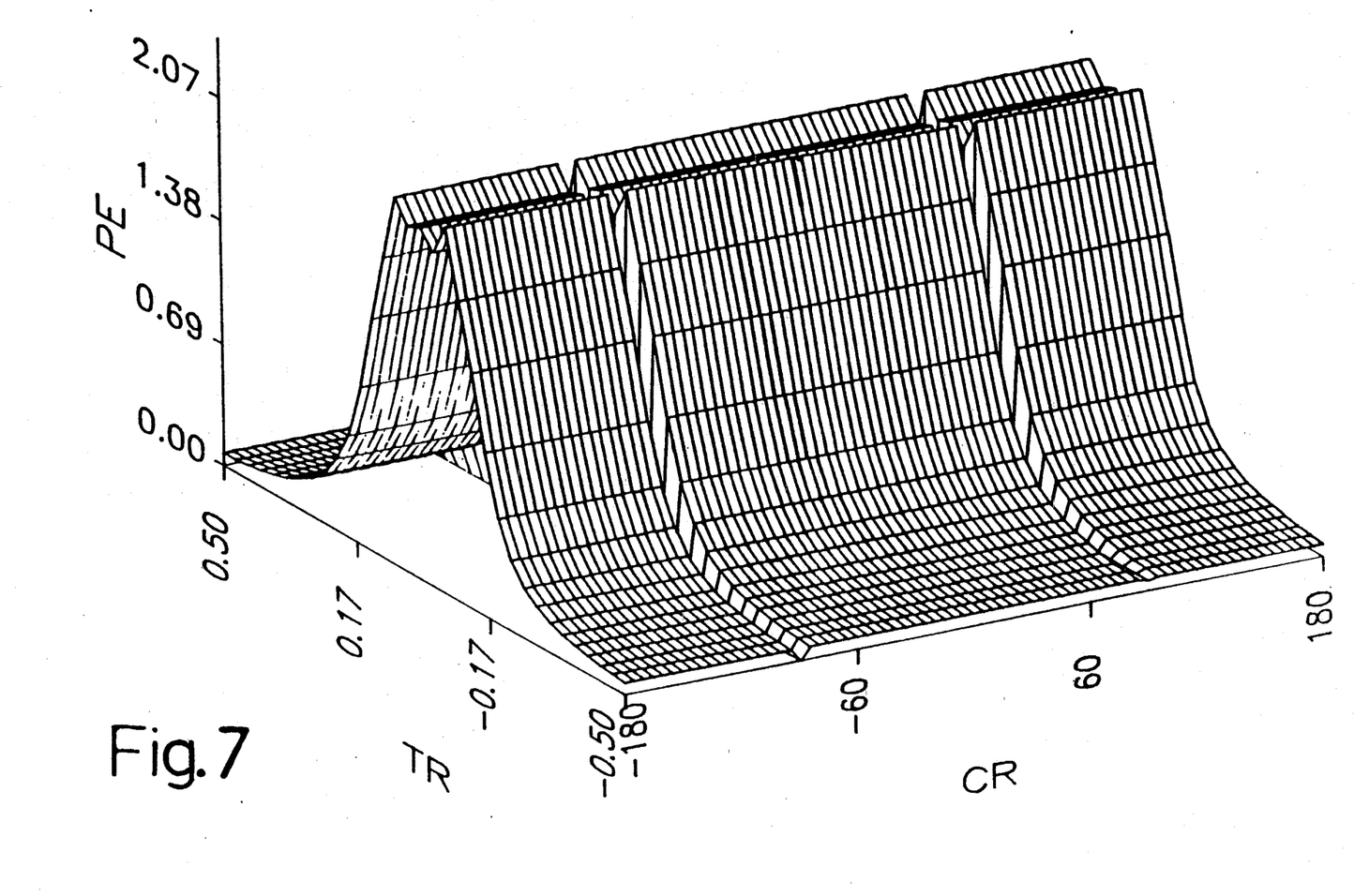
FIG. 7 is a diagram of the performance of 256 QAM scheme when new DFCRL, as given in the FIG. 5 and according to the present invention, is employed.
Figure 8:
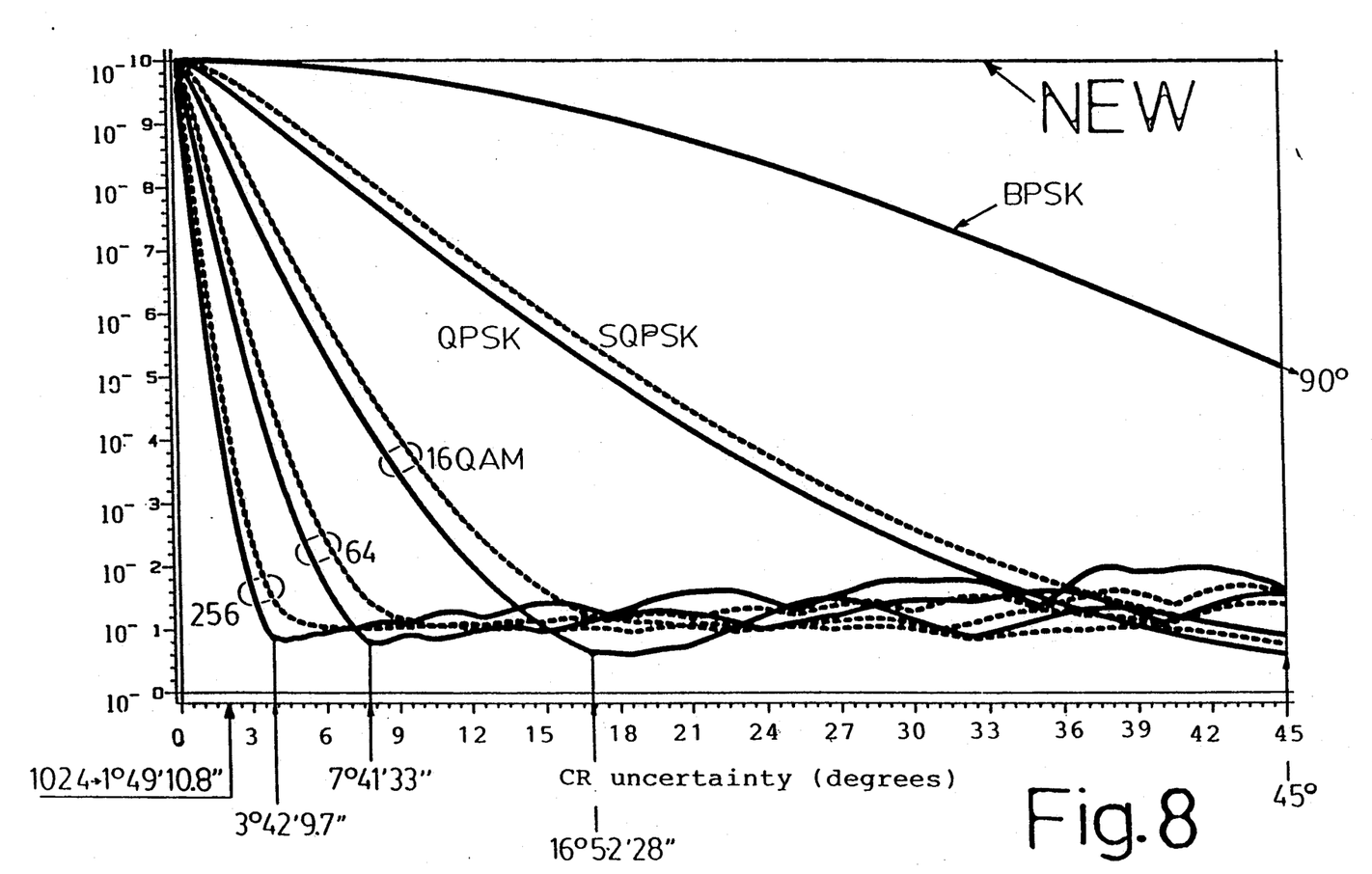
FIG. 8 is a diagram of the performance of M-ary QAM (MQAM) schemes when classical DFCRL as given in the FIG. 1 is employed.
Figure 10:
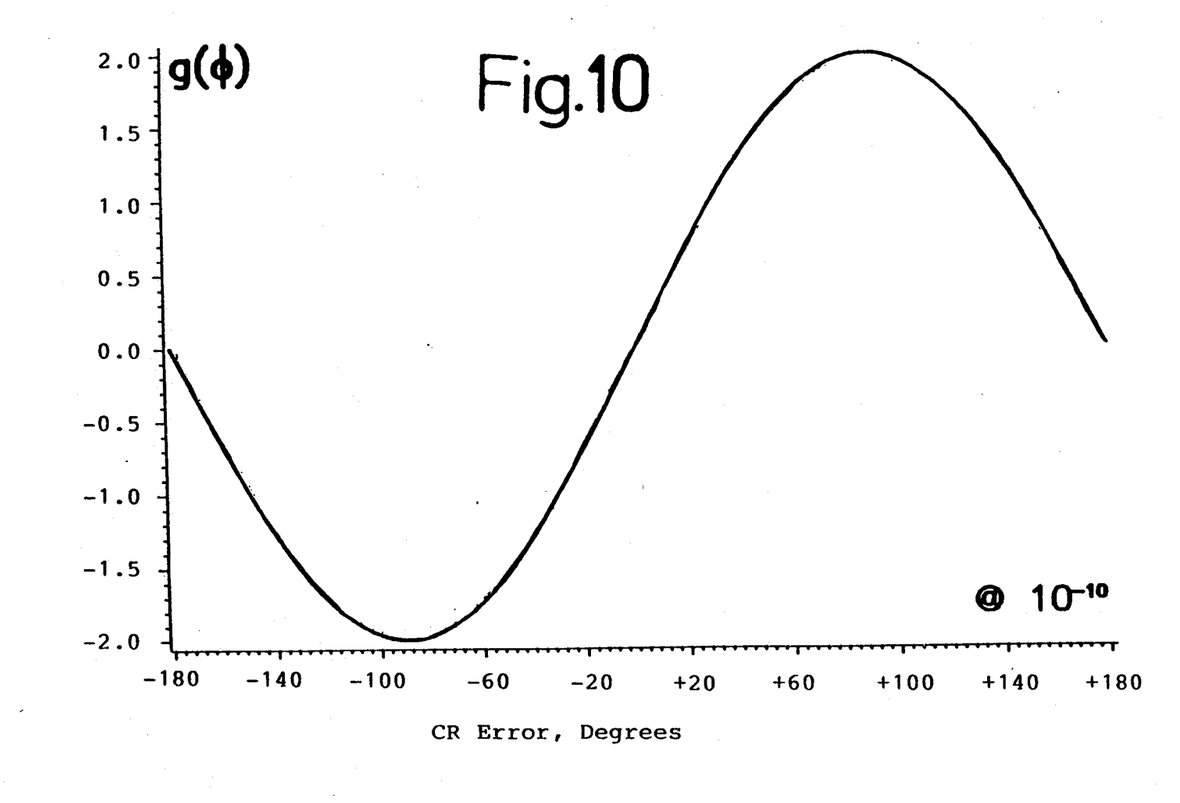
FIG. 10 is a diagram of the performance of MQAM schemes, i.e. nonlinearity S-curve of the loop (a shape of the signal 135) when new DFCRL as given in the FIG. 5 is employed.

A brief assessment of the performance of both the classical DFCRL, and the new DFCRL, i.e. the present invention, is given. The conditional probability of error $P(e|\phi, \lambda)$ performance of 256 QAM scheme in the presence of both carrier recovery error $\phi$ and timing recovery error $\lambda$, when the classical DFCRL is employed, is summarized in FIG. 6. If neither phase nor timing error is present the system operates at the best operating point of assumed $10^{-10}$, i.e. at the peak of the diagram. Extremly sharp peak signifies a high degree of sensitivity of the system to any phase or timing error. However, when the present invention is employed, the system is practically insensitive to phase errors and sensitivity to timing errors is drastically reduced, please see FIG. 7. Please note also the scale change, diagram in FIG. 6 extends from −45 to +45 degrees, while diagram in FIG. 7 extends from −180 to +180 degrees. The performance of MQAM schemes when classical DFCRL is employed is given in FIG. 8. As number of states M increases scheme becomes increasingly vulnerable to any carrier recovery error (CR uncertainty). However, when the loop according to the present invention is employed scheme is insensitive to CR error. The so called nonlinearity S-curve of the loop (a shape of the signal 135), FIG. 9, exhibit a periodicity of 90° (i.e. quadrant ambiguity) and a limited linear region when classical DFCRL is employed. However, by employing the scheme according to the present invention S-curve becomes a sinusoid, FIG. 10, with a period of 360°.

DETAILED DESCRIPTION OF THE INVENTION

The present invention will now be described. The scheme in FIG. 5 might be used for a carrier recovery and detection of a broad class of signal called weighted quadrature amplitude modulation (WQAM). The WQAM signal s(t, $\alpha$, $\beta$, $\epsilon_1$, $\epsilon_2$, $\theta$) with data rates $R_A = 1/T_A$ and $R_B = 1/T_B$ in the in-phase and quadrature channels respectively, can be represented by $$s(t,\alpha,\beta,\epsilon_1,\epsilon_2,\theta) = \quad (2)$$

$$\sqrt{P_A} \sum_i \underbrace{\alpha_i \omega_A[t - iT_A + \epsilon_1(t)]}_{x} \cos[2\pi f_c t + \theta(t)] +$$

$$\sqrt{P_B} \sum_j \underbrace{\beta_j \omega_B[t - (jT_B + \delta) + \epsilon_2(t)]}_{y} \sin[2\pi f_c t + \theta(t)], \, i,j \in \{I\}$$

Quantities $P_A$ and $P_B$ are the signal powers, $\alpha$ and $\beta$ are independent random data sequences, $\omega_A(t)$ and $\omega_B(t)$ are the pulse shaping functions (weights, windows) in channels A and B, defined on the interval $(-T_A/2, +T_A/2)$ and $(-T_B/2, +T_B/2)$, respectively, $f_c$ is the carrier frequency, and $\delta$ is an arbitrary delay in the B channel. $\epsilon_1(t)$ and $\epsilon_2(t)$ are random timing offsets assumed to be uniformly distributed on the interval $(-T_A/2, +T_A/2)$ and $(-T_B/2, +T_B/2)$, respectively, and $\theta(t)$ is the random carrier phase assumed to be uniformly distributed on the interval $(-\pi, +\pi)$. Summations over i, j extend over set of all integers $\{I\}$. Before any decision on data $\alpha$, $\beta$ has to be made, circuitry must establish the proper phase. How to do both, first estimate the phase, and second make decisions on input data is a topic of the present invention.

The present invention might be used for carrier synchronization and detection of modulation schemes such as quadrature phase shift keying (QPSK), staggered QPSK (SQPSK), minimum shift keying (MSK), M-ary phase shift keying (MPSK), staggered quadrature overlapped raised cosine (SQORC), unbalanced QPSK, and M-ary QAM (MQAM) which are all members of the WQAM family. Signal s(t, . . . ) could be spread in general, i.e. the present invention might also be employed for the carrier recovery and data detection of spread spectrum signals.

Figure 2A:
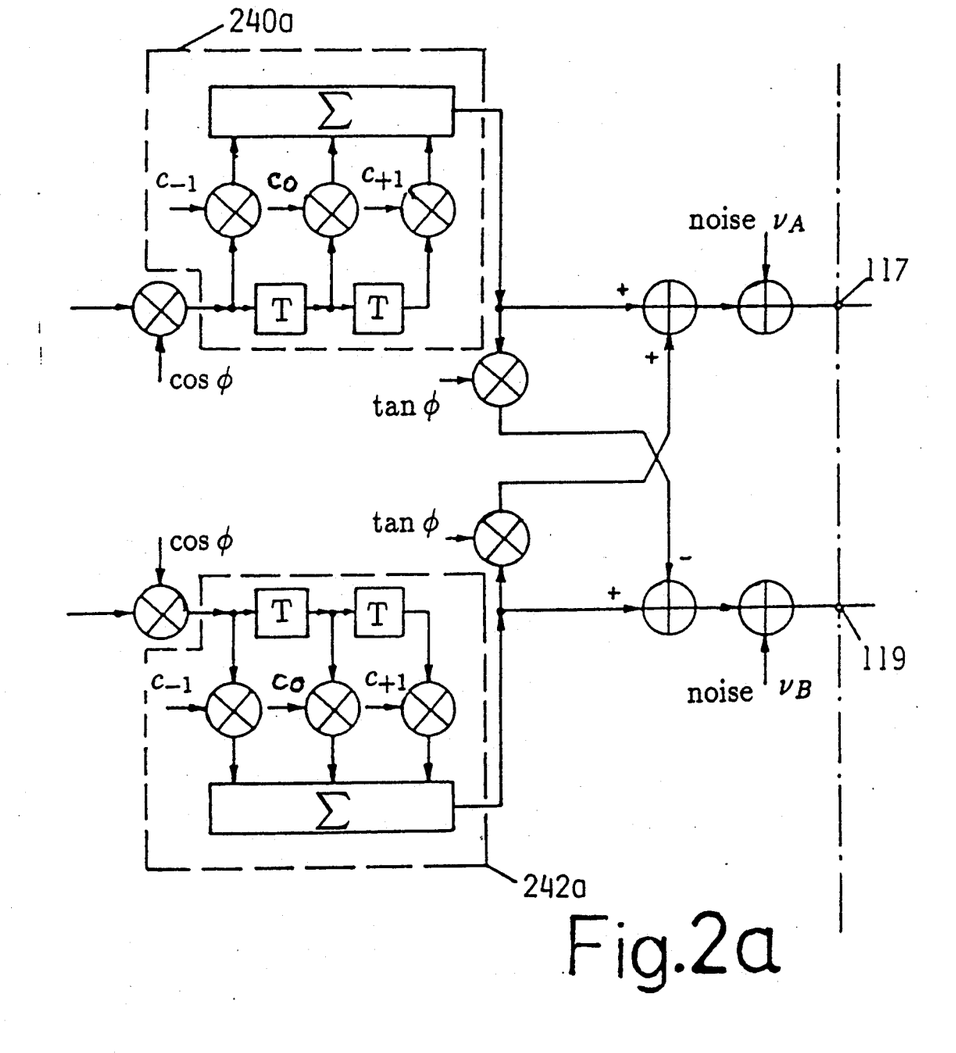
Figure 2B:
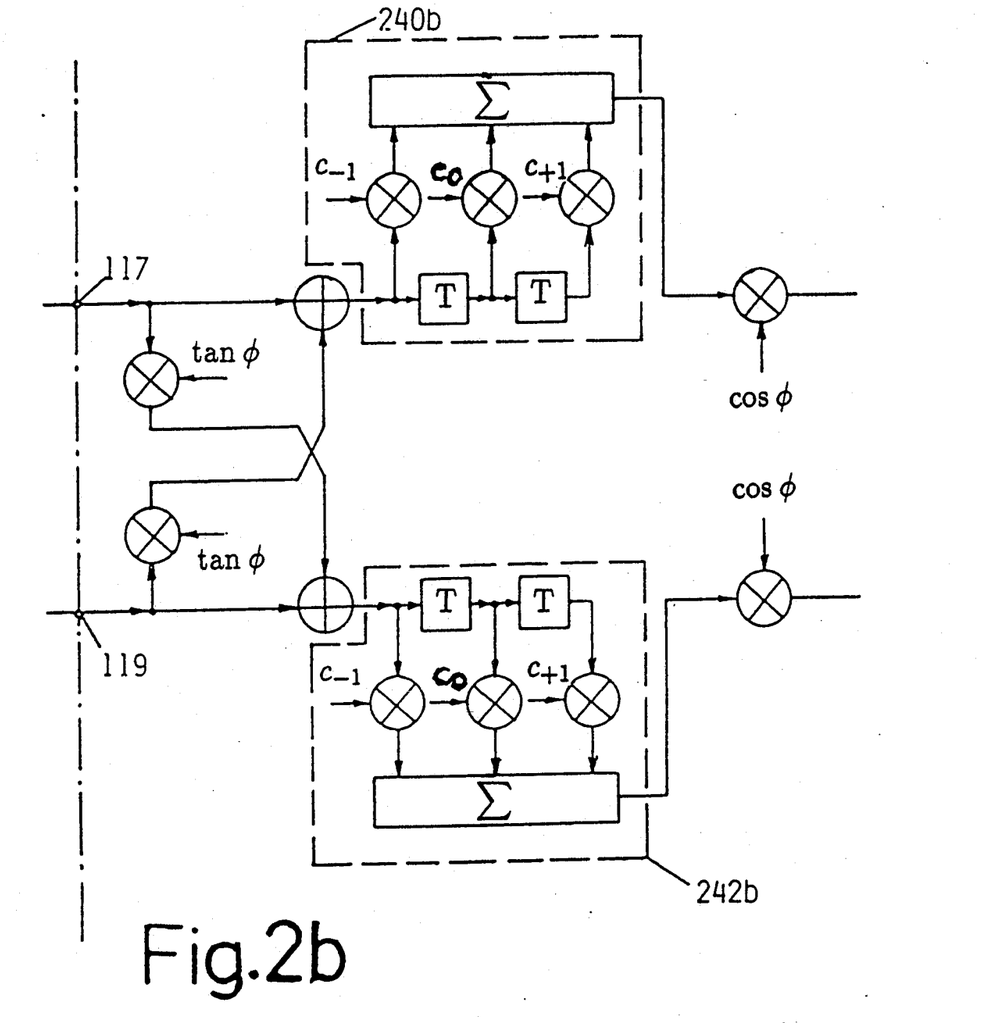

In order to understand the main idea of this invention, a reference to the prior art FIG. 1 and a model of degradations given in FIG. 2a is made. If classical DFCRL as given in FIG. 1 is employed, the signal 117, which is input to the decision device 122, suffers an attenuation proportional to cos $\phi$ (where $\phi$ is the carrier recovery error), a crosstalk proportional to sin $\phi$, intersymbol interference due to timing error $\lambda$ (modeled by a 3-tap equalizer 240a in FIG. 2a—note a tighter filtering will require an equalizer with more taps), and it is disturbed by noise $\nu_A$. In FIG. 2b, a complete compensating network—the main idea of this invention—which is a mirror image of degradation model in FIG. 2a (except for noise part), is presented. For the sake of clarity, first, we assume a perfect timing, i.e. $\lambda = 0$, and present the first part of this invention which compensates carrier phase error $\phi$ caused degradations in FIG. 3a–b. Secondly, we assume a perfect carrier recovery, i.e. $\phi = 0$, and present the second part of this invention which compensates timing recovery error $\lambda$ caused degradations in FIG. 4. Finally, the complete invention is presented in FIG. 5.

Figure 3A:
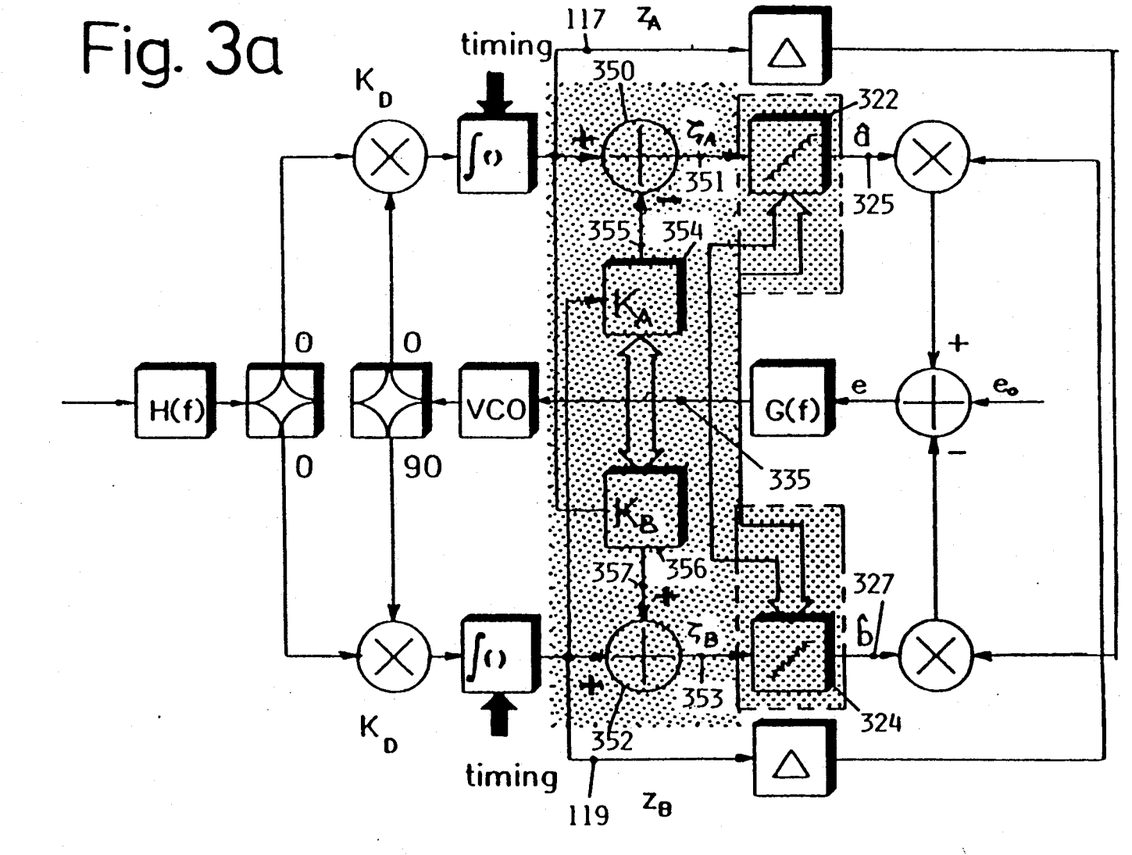
FIG. 3a is a diagram of carrier synchronization and detection scheme employing only carrier recovery error $\phi$ part of compensating network according to the present invention.

In FIG. 3a, the signal 117 and the signal 355 with the negative signum (the signal 355 is equivalent to the signal 119 amplified by the amplifier $K_A$ 354, which gain is proportional to the tan $\phi$) are added in device 350. The output signal $\zeta_A$ 351 from the device 350 is supplied to the decision device 322 which produces decision $\hat{a}$ (signal 325). Mathematically, this operation is equivalent to $$\zeta_A = (+\alpha_m \cos\phi + b_n \sin\theta + \nu_A) - \quad (3)$$
$$(-\alpha_m \sin\phi + b_n \cos\phi + \nu_B)\tan\phi$$
$$= \frac{\alpha_m}{\cos\phi} + (\nu_A - \nu_B \tan\phi)$$

i.e. no crosstalk occurs and the signal-to-noise ratio remains constant, since both the desired signal and noise are increased in the same proportion. A decision is independent of carrier recovery (CR) error $-P(e|\phi)=$ constant—i.e. the loop operates as a continuous wave (pilot tone) CR loop and the nonlinearity S-curve (the shape of signal 335 as a function of $\phi$ equals sin $\phi$). As a final result, the pattern jitter is cancelled (practically, it is attenuated by an amount proportional to the ratio of data and loop bandwidths) and, more importantly, the quadrant ambiguities previously present due to the combination of signal constellation and fixed threshold decision devices, have vanished.

Figure 3B:
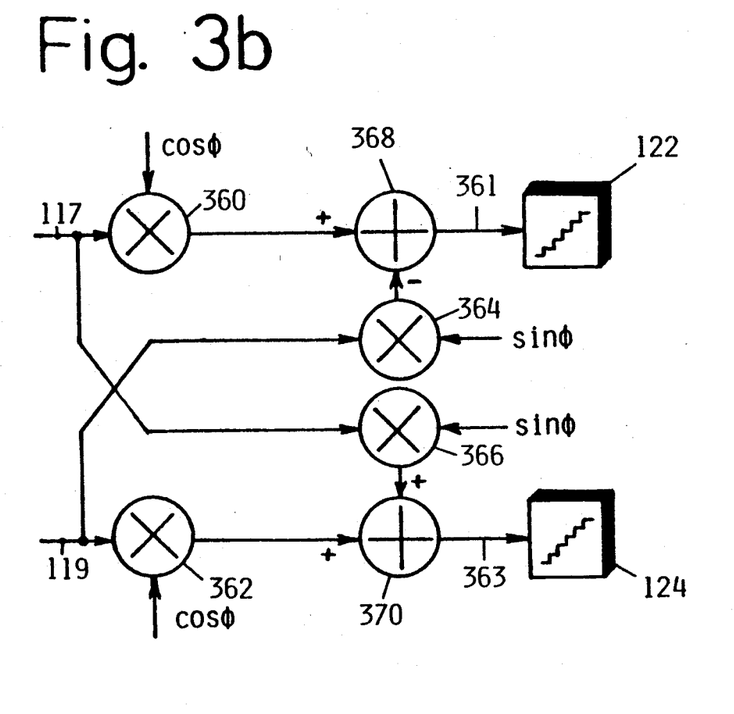
FIG. 3b is a diagram of the part of compensating network according to the present invention.

E.g., let's brief the necessary performance of the $K_A(\phi)$ and $K_B(\phi)$ devices (amplifiers). Let's assume the symbol rate equals 10 Msymbols/s. Then, the necessary bandwidth of the $K_A(\phi)$ and $K_B(\phi)$ devices is in the range of the tens of MHz. Usually, the loop bandwidth is a one hundred or more times narrower than the bandwidth of the data. Therefore, the phase changes $\phi$ and the necessary dynamic changes of the $K_A(\phi)$ and $K_B(\phi)$ amplifiers are in the range of one hundred of kHz, or lower. The necessary gain is proportional to the tan $\phi$. If $|\phi| < 45°$, $K_A(\phi)$ and $K_B(\phi)$ perform as attenuators. If the maximal available gains of $K_A(\phi)$, $K_B(\phi)$ equal 100, the tan $\phi$ function might be modeled for any $\phi$ except in the 1° wide strips around $\pm 90°$. In practice, for most of the time, phase error $\phi < 45°$ and $K_A$, $K_B$ will be adjustable attenuators. Devices 322, 324 are adjustable quantizers, which might be realized as a cascade of the adjustable attenuator and the fix quantizer (see FIG. 5). In many applications the scheme in FIG. 3b might have practical advantages over the solutions presented in FIG. 3a and FIG. 5. Here, four adjustable attenuators (360, 362—which gain is proportional to the cos $\phi$, and 364, 366—which gain is proportional to the sin $\phi$) and two adders (368, 370) are employed to cancel crosstalk, i.e. signal 361 equals $$\zeta_A = (+a_m \cos\phi + b_n \sin\phi + \nu_A)\cos\phi - \qquad (4)$$
$$(-a_m \sin\phi + b_n \cos\phi + \nu_B)\tan\phi$$

$$= a_m + \underbrace{\nu_A \cos\phi - \nu_B \sin\phi}_{\text{noise}}$$

Figure 4:
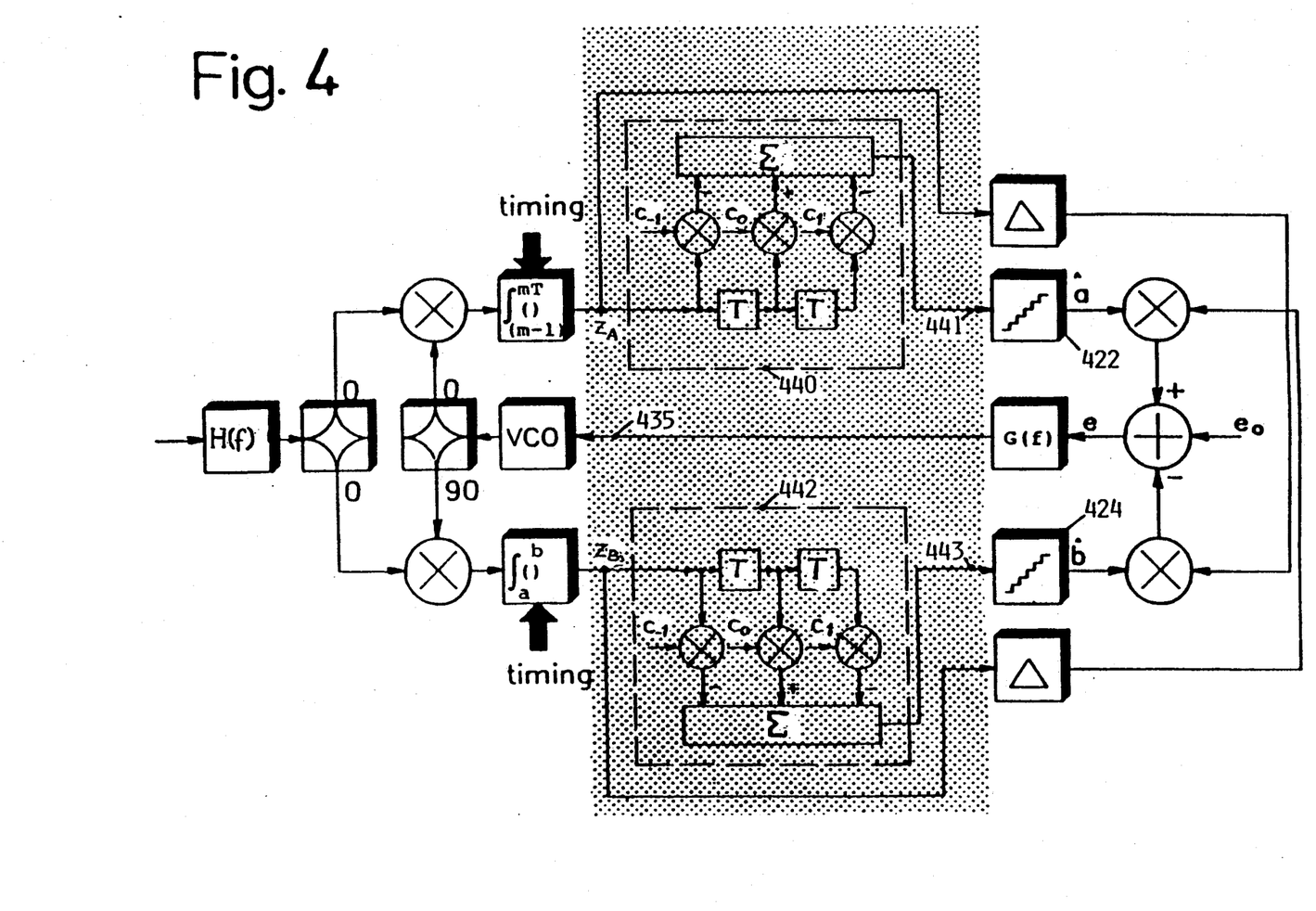
FIG. 4 is a diagram of carrier synchronization and detection scheme employing only timing recovery error $\lambda$ part of compensating network according to the present invention.

In FIG. 4 the compensation of timing recovery error $\lambda$ caused degradations is presented. It is easy to see that a timing error $\lambda$ causes complex ISI. As an example, these negative effects might be partially overcome by employing a simple 3-tap equalizer, devices 440, 442, whose central tap gain is proportional to $+1/R(|\lambda|)$ and the gains of two neighboring taps are proportional to the product of $-R(1-|\lambda|)$ and the corresponding step function ($c_{-1}=0$ for $\lambda \geq 0$, while $c_{+1}=0$ for $\lambda \leq 0$), where R(x) is the corresponding autocorrelation function. For example, if quadrature amplitude modulation scheme with rectangular pulses, each ($-T/2$, $+T/2$) long, is employed, the corresponding autocorrelation function of each pulse will be triangular in shape and will extend over ($-T$, $+T$) interval. These quantities (voltages) are provided by an external timing recovery circuit (clock), which itself is not a part of this invention. In a system employing narrowband filtering, an equalizer with more taps will be necessary. A person skillfull in the art might be able to employ different types of equalizers, depending on a particular application. Note many different equalizer structures are used in practice, including those with preset or adaptive coefficients. However, our solution is related to the timing recovery error $\lambda$ caused intersymbol interference (ISI), while most of existing solutions deal with filtering (and selective channel) caused ISI, instead. The noise after the equalizer is Gaussian but not white with variance $\sigma_n^2 = \{R^{-2}(|\lambda|) + R^2(1-|\lambda|)\}N_o$. Timing error caused ISI pattern jitter is cancelled but signal-to-noise ratio at input to decision device 422 and the corresponding conditional probability of error deteriorate as $\lambda$ increases. However, this deterioration is not as severe as in the classical DFCRL. The relative improvement increases as the number of baseband levels increases.

Figure 5:
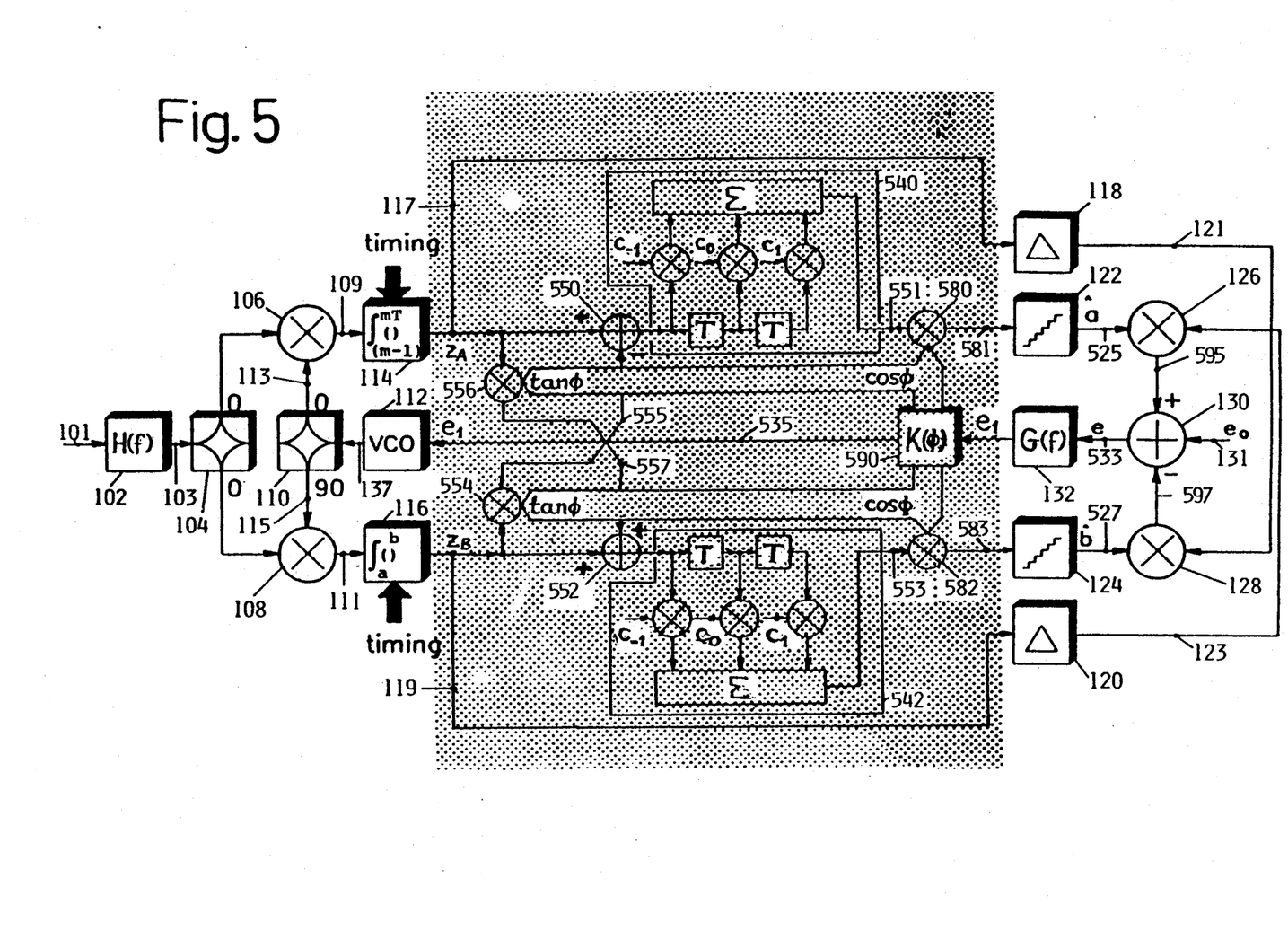
FIG. 5 is a complete block diagram of carrier synchronization and detection network according to the present invention.

The complete invention is presented in FIG. 5. The modulated waveform is supplied to the input terminal 101 and filtered by the filter H(f) 102. Filtered signal 103 is supplied to the 0–0 degrees splitter 104 from which it is supplied as an input to each of mixers 106 and 108. The input signals are then translated to the baseband (signals 109 and 111) using referent carrier signals 113 and 115 received through the 0–90 degrees splitter 110 from a voltage controlled oscillator (VCO) 112. The signals 109 and 111 are supplied to the corresponding integrate-sample-and-dump (ISD) devices 114 and 116, which are receiving proper timing information from outside timing recovery circuits. Devices 114 and 116 may also be baseband low-pass filters. The output signals from these devices, i.e. $z_A$ 117 and $z_B$ 119 are supplied to delay elements 118 and 120. The delay elements 118, 120 provide appropriate allignments of signals 121 and 123, which are supplied to corresponding mixers 126 and 128.

A significant distinction between the prior art (e.g. classical DFCRL, FIG. 1, and refered patents) and the present invention is the method—and the corresponding apparatus—(shaded part on FIGS. 3-5 and FIG. 2) which wipe-off data, i.e. cancells pattern jitter, and as a consequence removes also the quadrant 90 degrees periodicity. The signal 117 and the signal 555 with the negative signum (the signal 555 is equivalent to the signal 119 amplified by the amplifier 554, which gain is proportional to the tan $\phi$) are added in device 550. The output from device 550 is supplied to the equalizer 540 which cancells timing error caused ISI. The output signal 551 from the device 540 is appropriatelly scaled by the attenuator 580 and supplied to the decision device 122 which produces decision â (signal 525). Similarly, the signal 119 and the signal 557 (the signal 557 is equivalent to the signal 117 amplified by the amplifier 556, which gain is proportional to the tan $\phi$) are added in device 552. The output from device 552 is supplied to the equalizer 542 which cancells timing error caused ISI. The equalizers, devices 540, 542, central tap gain is proportional to $+1/R(|\lambda|)$ and the gains of two neighboring taps are proportional to the product of $-R(1-|\lambda|)$ and the corresponding step function ($c_{-1}=0$ for $\lambda \geq 0$, while $c_{+1}=0$ for $\lambda \leq 0$), where R(x) is the corresponding autocorrelation function. For example, if quadrature amplitude modulation scheme with rectangular pulses, each ($-T/2$, $+T/2$) long, is employed, the corresponding autocorrelation function of each pulse will be triangular in shape and will extend over ($-T$, $+T$) interval. These quantities (voltages) are provided by an external timing recovery circuit (clock), which itself is not a part of this invention. The output signal 553 from the device 542 is appropriatelly scaled by the attenuator 582 and supplied to the decision device 124 which produces decision b̂ (signal 527). The device 590 provides the information about phase error $\phi$, which is extracted from the signal 535 (note this signal approximatelly equals sin $\phi$), to the amplifiers 554, 556 and attenuators 580, 582. As a result, clean signals 581, 583 (without intersymbol interference due to timing error and without crosstalk components due to carrier phase error) are supplied to the decision devices 122, 124. Therefore, better decisions with lower $P(e|\phi, \lambda)$ are possible which will result in better phase estimation, better phase estimation will allowe improved decisions, etc. The other two signals 525 and 527 which are supplied to the mixers 126, 128 are digital outputs from respective decision devices 122 and 124 and represent data estimates â and b̂. The output signals 595 and 597 from the corresponding mixers 126, 128 are subtracted in a device 130. An additional correction signal $e_0$ (131) may be supplied to the device 130. An output from the device 130, i.e. signal e (533), is supplied to the baseband low-pass loop filter G(f) 132. An output signal 535 from the filter 132 is at the same time the input control signal to the VCO 112, and input/output signal to/from device 590.

Significant advantages of the circuitry according to the present invention are that the decisions (data estimates) are independent of carrier phase error, while dependence on timing error is greatly reduced. Since these improved estimates (on current symbols) are further employed for estimation of carrier phase (during future data symbols), the present invention will also provide an improved estimation of carrier phase. The presence of data in the input signal caused pattern jitter and quadrant ambiguity, if classical DFCRL were used. The present invention wipe-off data (i.e. pattern jitter) and removes quadrant 90 degrees periodicity.

As a result of these various features and advantages, the carrier recovery and data detection circuitry according to the present invention might use less narrow loop filter G(f) 132, which will provide a better (shorter) acquisition time and better cancellation of carrier's phase noise of frequency sources. Since decisions are virtually independent of phase error, circuitry according to the present invention will be less prone to loop stresses caused by d.c. wanderings within the loop, component imperfections, and channel asymmetry (e.g. caused by selective fading multipath propagation, etc.).

It should be appreciated that there are various possibilities for implementing the various system blocks disclosed above, all of which possibilities fall within the scope of the present invention. Without limitations, some examples of circuit details which could be used to implement the present invention are as follows. First, for particular applications the complete, or in parts, circuitry could be implemented by use of microprocessor or signal processing chips. Next, filters, mixers, and VCO might be analog or digital. The delay elements could be implemented by using all-pass filter sections, charge coupled devices, surface acoustic wave devices, multivibrators, or just an appropriate length of cable or strip-line, etc. At microwave frequencies signal dividers (splitters) could be implemented in microstrip or strip-line technique, etc.

It should be appreciated further that the present invention might be incorporated within known carrier recovery and data detection (signal estimation) schemes which differ from that presented in FIG. 1 (e.g. television receiver circuitry, stereo circuitry, etc.).

I claim:

1. In an apparatus for estimating concurrent phase synchronization and data detection from a received signal (103), said received signal including at least one suppressed carrier modulated with at least one data signal, said apparatus including:
   a) first mixing means (106, 108) for mixing said received signal (103) with a reference carrier signal (113, 115) and providing a first mixing means output (109, 111);
   b) data recovery means for sampling (114, 116) said first mixing means output and providing a first sampling means output (117, 119);
   c) delay element means (118, 120) for delaying said first sampling means output and providing a first delaying means output (121, 123);
   d) first amplification means (554, 556) for amplification said first sampling means output (119, 117), where an amount of amplification—gain is governed by a phase setting signal (535) and providing a first amplified output (555, 557);
   e) first signal addition/subtraction means (550, 552) for addition/subtraction said first amplified output and said first sampling means output (117, 119) and providing a first sum means output;
   f) first equalization means (540, 542) for equalization of timing error caused intersymbol interference said first sum means output, where tap gains are governed by the timing (clock) error signal, and providing a first equalized signal (551, 553),
   g) attenuation means (580, 582) for attenuation said first equalized signal, where an amount of attenuation is governed by said phase setting signal (535) and providing a second attenuated output (581, 583);
   h) first data estimating means (122, 124) for estimating said second attenuated output to obtain a data estimate (525, 527);
   i) second mixing means (126, 128) for mixing said data estimate with said first delaying means and providing a second mixing means output (595, 597);
   j) second signal addition/subtraction means (130) for addition/subtraction of second mixing means and a correction signal (131) and providing a first error signal (533);
   k) filtering means G(f) (132) for filtering of said first error signal and providing a first filtered error signal;
   l) signal estimating means (590) for estimating said first filtered error signal and providing said phase setting signal (535);
   m) first voltage controlled oscillator means (112) for providing an estimated carrier phase error signal (137) in accordance with said phase setting signal;
   n) splitting means (110) for splitting said estimated carrier phase error signal and providing said reference carrier signal (113, 115).

* * * * *